(12) United States Patent
Yang et al.

(10) Patent No.: US 9,274,638 B2
(45) Date of Patent: Mar. 1, 2016

(54) TOUCH PANEL

(71) Applicant: AU Optronics Corporation, Hsin-Chu (TW)

(72) Inventors: Shih-Wei Yang, Hsin-Chu (TW); An-Cheng Chen, Hsin-Chu (TW); Shih-Po Chou, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 139 days.

(21) Appl. No.: 14/271,587

(22) Filed: May 7, 2014

(65) Prior Publication Data

US 2014/0333854 A1   Nov. 13, 2014

(30) Foreign Application Priority Data

May 9, 2013   (TW) ............................... 102116561 A

(51) Int. Cl.
*G06F 3/041* (2006.01)
(52) U.S. Cl.
CPC .................................... *G06F 3/0412* (2013.01)
(58) Field of Classification Search
CPC .................. G06F 3/041; G06F 3/0412; G06F 2203/04103
USPC ...................... 345/173–179; 178/18.01–18.09
See application file for complete search history.

(56) References Cited

U.S. PATENT DOCUMENTS

| | | | | |
|---|---|---|---|---|
| 2004/0207605 A1* | 10/2004 | Mackey | .................. | G06F 3/042 345/173 |
| 2011/0279405 A1* | 11/2011 | Meng | ....................... | G06F 3/044 345/174 |
| 2012/0113032 A1* | 5/2012 | Itakura | .................... | G06F 3/044 345/173 |
| 2014/0054145 A1* | 2/2014 | Chi | ..................... | G06F 3/03547 200/304 |
| 2014/0168545 A1* | 6/2014 | Han | ........................ | G06F 3/047 349/12 |
| 2014/0197017 A1* | 7/2014 | Lien | ........................ | G06F 3/023 200/600 |
| 2015/0077654 A1* | 3/2015 | Chu | ........................ | G06F 1/169 349/12 |

FOREIGN PATENT DOCUMENTS

| | | |
|---|---|---|
| CN | 201946253 | 8/2011 |
| CN | 202110728 | 1/2012 |
| CN | 103019421 | 4/2013 |
| EP | 2757443 | 7/2014 |
| TW | 294636 | 1/1997 |
| TW | 200907878 A | 2/2009 |
| TW | 200946367 A | 11/2009 |
| TW | 201337663 | 9/2013 |
| TW | 201430648 | 8/2014 |

\* cited by examiner

*Primary Examiner* — Amare Mengistu
*Assistant Examiner* — Stacy Khoo
(74) *Attorney, Agent, or Firm* — WPAT, P.C.; Justin King

(57) ABSTRACT

A touch panel includes a substrate, a light-shielding layer, a patterned transparent layer, a reflecting layer, at least one first sensing series, and at least one second sensing series. The substrate has a touch sensing region and a peripheral region. The light-shielding layer is disposed in the periphery region. The light-shielding layer has a patterned opening and a sidewall adjacent to the patterned opening. The patterned opening is configured to provide a mark identifiable by human eyes. The patterned transparent layer is disposed in the peripheral region, and the patterned transparent layer covers a portion of the patterned opening. The patterned transparent layer has an inclined sidewall positioned in the patterned opening. The reflecting layer covers the inclined sidewall and the patterned opening. The first sensing series and the second sensing series are arranged in the touch sensing region to detect a position of a touch point.

19 Claims, 5 Drawing Sheets

TOUCH PANEL

RELATED APPLICATIONS

This application claims priority to Taiwan Application Serial Number 102116561, filed May 9, 2013, which is herein incorporated by reference.

BACKGROUND

1. Technical Field

The present disclosure relates to a touch panel.

2. Description of Related Art

In recent years, touch panel devices have been extensively utilized in various electronic products, such as mobile phones, personal digital assistants, laptops, and planet computers. Among these electronic products, a display panel and a touch device are combined to form a touch panel and become an effective human-computer interface. The touch panel has become a trend and gradually replaced traditional input devices, such as keyboards, mice, etc.

In many of the electronic products, touch panel is usually disposed on or embedded in the display panel to allow users to input information conveniently. The aesthetic design of touch panel is sensed by users intuitively and such an aesthetic design would affect the overall appearances of electronic products. Hence, many researchers are devoted to enhancing the aesthetic feelings of appearances of touch panels.

As mentioned, the aesthetic design of touch panels is important. In addition, because consumers are able to perceive the appearances of touch panels intuitively, many trademarks or marks indicating particular meanings are designed on the touch panels. Hence, if a stereoscopic trademark or mark can be disposed on the touch panel, brand value is even more highlighted. Therefore, there exists in this art a need for an improved touch panel, which would exhibit a stereoscopic trademark or mark.

SUMMARY

It is an objective of the present disclosure to provide a touch panel so as to exhibit a stereoscopic mark identifiable by human eyes, more particularly, a touch panel to show a stereoscopic mark identifiable by human eyes without increasing the complexity of processing.

The touch panel comprises a substrate, a light-shielding layer, a patterned transparent layer, a reflecting layer, at least one first sensing series, and at least one second sensing series. The substrate has a touch detecting region and a peripheral region surrounding the touch detecting region. The light-shielding layer is disposed in the peripheral region of the substrate. The light-shielding layer has a patterned opening and a sidewall adjacent to the patterned opening. The patterned opening is configured to provide a mark identifiable by human eyes. The patterned transparent layer is disposed in the peripheral region of the substrate. The patterned transparent layer covers a portion of the patterned opening, and the patterned transparent layer has an inclined sidewall positioned in the patterned opening. The reflecting layer is disposed in the peripheral region of the substrate. The reflecting layer covers the patterned transparent layer and the patterned opening. The first sensing series is disposed in the touch detecting region of the substrate. The first sensing series extends in a first direction and comprises a plurality of first touch sensing pads and a plurality of first bridging lines. Each of the first bridging lines interconnects two adjacent ones of the first touch sensing pads in series. The second sensing series is disposed in the touch detecting region of the substrate. The second sensing series extends in a second direction different from the first direction. The second sensing series comprises a plurality of second touch sensing pads and a plurality of second bridging lines. Each of the second bridging lines interconnects two adjacent ones of the second touch sensing pads in series.

According to one embodiment of the present disclosure, the patterned transparent layer covers at least a portion of the sidewall of the light-shielding layer to form a first opening exposing a portion of the substrate.

According to one embodiment of the present disclosure, the inclined sidewall surrounds the first opening.

According to one embodiment of the present disclosure, the patterned transparent layer is positioned in the patterned opening and is not in contact with the sidewall of the light-shielding layer to form a second opening exposing a portion of the substrate.

According to one embodiment of the present disclosure, the second opening is located between the sidewall of the light-shielding layer and the inclined sidewall.

According to one embodiment of the present disclosure, the touch panel further comprises a patterned insulation layer disposed between the first bridging lines and the second bridging lines, and each of the second bridging line crosses over one of the first bridging line.

According to one embodiment of the present disclosure, the patterned insulation layer is formed from a same layer as the patterned transparent layer.

According to one embodiment of the present disclosure, the patterned insulation layer and the patterned transparent layer are made of a same material.

According to one embodiment of the present disclosure, the touch panel further comprises at least one contact pad and at least one signal transmission line. The signal transmission line extends from the contact pad and is electrically connected to the first sensing series or the second sensing series.

According to one embodiment of the present disclosure, the reflecting layer, the contact pad, and the signal transmission line are formed from a same layer.

According to one embodiment of the present disclosure, the reflecting layer, the contact pad, and the signal transmission line are made of a same material.

According to one embodiment of the present disclosure, an angle formed between the inclined sidewall and the substrate is about 100 degrees to about 150 degrees.

According to one embodiment of the present disclosure, the patterned transparent layer has a refractive index of about 1.4 to about 2.0.

According to one embodiment of the present disclosure, the patterned transparent layer has a thickness of about 2 μm and about 50 μm.

According to one embodiment of the present disclosure, the light-shielding layer has a thickness of about 2 μm and about 40 μm.

According to one embodiment of the present disclosure, the patterned transparent layer comprises an organic material or an inorganic material.

According to one embodiment of the present disclosure, the reflecting layer comprises a metal material or a conductive organic material containing metal.

According to one embodiment of the present disclosure, the patterned transparent layer completely covers the patterned opening. The patterned transparent layer has a projection portion and a surrounding portion encircling the projection portion. The inclined sidewall is positioned between the projection portion and the surrounding portion.

According to one embodiment of the present disclosure, the projection portion has a thickness substantially greater than a thickness of the surrounding portion, and the thickness of the surrounding portion is substantially less than a thickness of the light-shielding layer.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
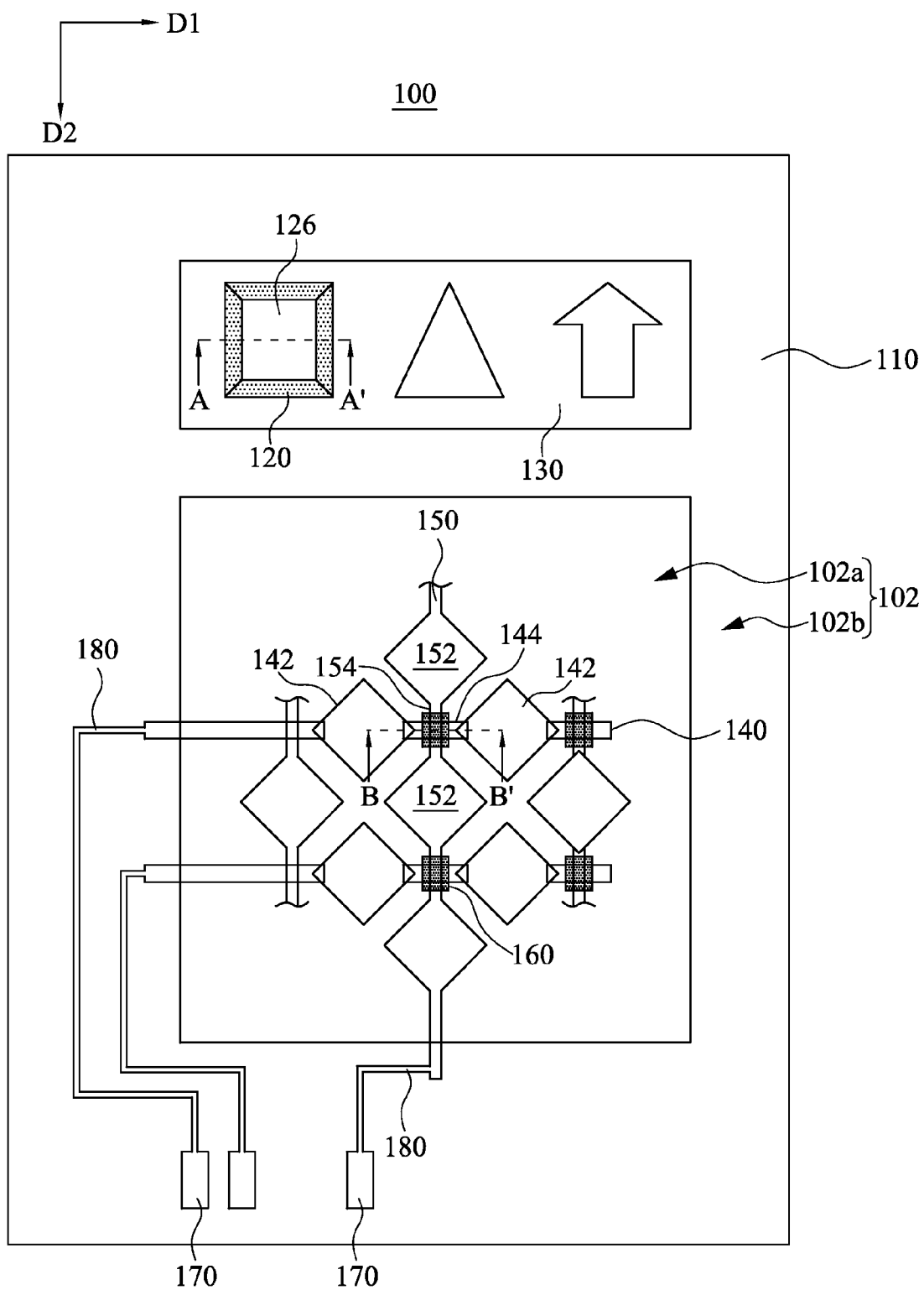
FIG. 1 is a schematic top view of a touch panel according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

First Embodiment

Figure 2A:
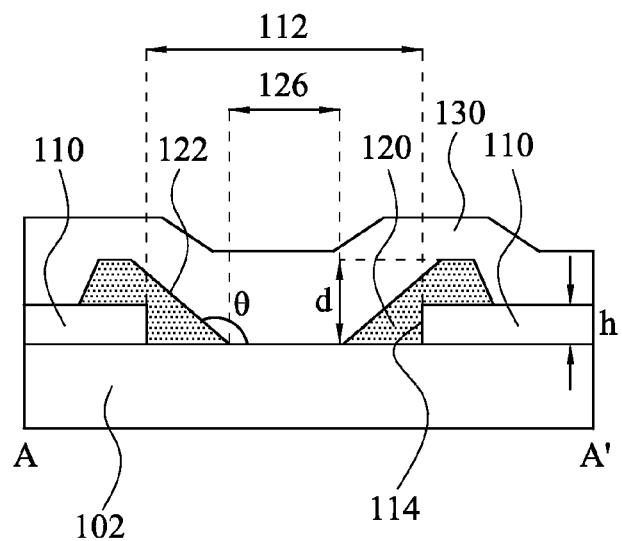
FIG. 2A is a schematic cross-sectional view taken along line A-A' of FIG. 1.
Figure 2B:
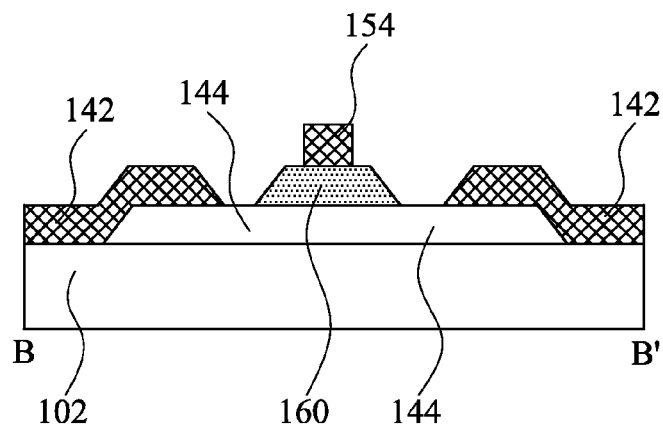
FIG. 2B is a schematic cross-sectional view taken along line B-B' of FIG. 1.

FIG. 1 is a schematic top view of a touch panel 100 according to a first embodiment of the disclosure. FIG. 2A is schematic a cross-sectional view taken along line A-A' of FIG. 1. FIG. 2B is a schematic cross-sectional view taken along line B-B' of FIG. 1. The touch panel 100 comprises a substrate 102, a light-shielding layer 110, a patterned transparent layer 120, a reflecting layer 130, at least one first sensing series 140, and at least one second sensing series 150.

As shown in FIG. 1, the substrate 102 has a touch detecting region 102a and a peripheral region 102b. The first sensing series 140 and the second sensing series 150 cross perpendicularly each other and are disposed in the touch detecting region 102a to detect a position of a touched point. The number of the first sensing series 140 may be one or plural and the number of the second sensing series 150 may be one or plural, depending on the practical conditions of products. The peripheral region 102b is in the periphery of the substrate 102 and surrounds the touch detecting region 102a. A material of the substrate 102 may comprise an organic transparent material or an inorganic transparent material, such as glass, plastic, etc.

Referring to FIG. 1 and FIG. 2A, the light-shielding layer 110 is disposed in the peripheral region 102b of the substrate 102. The light-shielding layer 110 has a patterned opening 112 and a sidewall 114 (as depicted in FIG. 2A). The patterned opening 112 is configured to provide a mark identifiable by human eyes, such as a trademark, a character, or other patterns. The sidewall 114 of the light-shielding layer 110 is adjacent to the patterned opening 112 and surrounds the patterned opening 112. In other words, the sidewall 114 is approximately the boundary of the patterned opening 112. In one example, a material of the light-shielding layer 110 may be an opaque material, such as a black resin. A thickness h of the light-shielding layer 110 may be, for example, between about 2 μm and about 40 μm.

The patterned transparent layer 120 is disposed in the peripheral region 102b of the substrate 102, and a portion of the patterned transparent layer 120 covers the patterned opening 112. The term "cover" herein has a meaning that comprises to cover completely and to cover partially. In the embodiment depicted in FIG. 2A, the patterned transparent layer 120 only covers a portion of the patterned opening 112 and does not cover the whole patterned opening 112. A first opening 126 smaller than the patterned opening 112 is thus formed to expose a portion of the substrate 102. The first opening 126 is inside the patterned opening 112. In other embodiments, the patterned transparent layer 120 may cover the patterned opening 112 completely. The patterned transparent layer 120 may be arranged in various manners, and more detailed description in this regard will be provided in the second embodiment and the third embodiment. The patterned transparent layer 120 has an inclined sidewall 122 positioned in the patterned opening 112. In one example, an angle θ is formed between the inclined sidewall 122 and the substrate 102, and the angle θ is between about 100 degrees and about 150 degrees.

In this embodiment, the patterned transparent layer 120 also covers the sidewall 114 of the light-shielding layer 110. The inclined sidewall 122 of the patterned transparent layer 120 surrounds the first opening 126. A material of the patterned transparent layer 120 may comprise an inorganic material, such as silicon oxide, silicon nitride, etc., or an organic polymer material. In one example, a refractive index of the patterned transparent layer 120 is between about 1.4 and about 2.0. In another example, a thickness d of the patterned transparent layer 120 is between about 2 μm and about 50 μm. In the embodiment depicted in FIG. 2A, the thickness d denotes a distance from a bottom of the inclined sidewall 122 to a top of the inclined sidewall 122. In other various embodiments, the patterned transparent layer 120 may only cover a portion of the sidewall 114 of the light-shielding layer 110 depending on the character or pattern intended to be shown by the patterned opening 112. Under the circumstances, the inclined sidewall 122 does not surround the first opening 126, rather, the inclined sidewall 122 of the patterned transparent layer 120 is only formed on a portion of the sidewall 114.

Figure 2C:
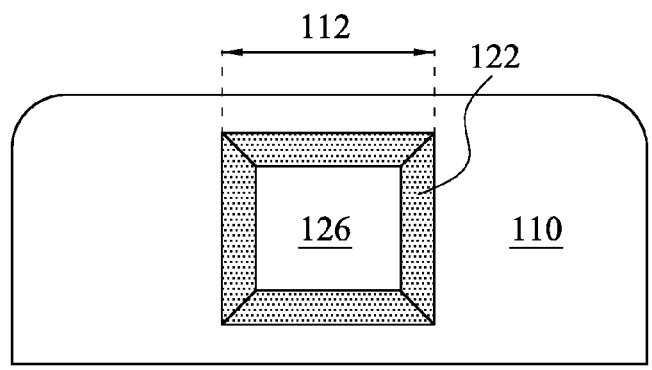
FIG. 2C is a schematic top view of a patterned opening when viewing from the side of the substrate according to one embodiment of the disclosure.

The reflecting layer 130 is disposed in the peripheral region 102b of the substrate 102 and covers the inclined sidewall 122 of the patterned transparent layer 120 and the patterned opening 112. The reflecting layer 130 is utilized for reflecting light incident from a side of the substrate 102 (incident from the bottom surface of the substrate). The interface between the reflecting layer 130 and the inclined sidewall 122 forms an inclined reflective surface, and the interface of the reflecting layer 130 and the substrate 102 forms another reflective surface. Hence, when users view the patterned opening 112 from the side of the substrate 102, a stereoscopic embossing effect is created. More specifically, the inclined reflective surface sets off the reflective surface to allow the stereoscopic embossing effect to be created in a center portion (that is the reflective surface portion) of the patterned opening 112. FIG. 2C depicts a schematic top view of the patterned opening 112 when viewing from the side of the substrate 102. The reflecting layer 130 in the first opening 126 creates the stereoscopic embossing effect. As mentioned hereinbefore, the patterned opening 112 is configured to provide a trademark, a character, or other patterns identifiable by human eyes. With this configuration, a trademark, a character, or patterns with a stereoscopic effect can be produced according to embodiments of the present disclosure. There is no special limitation to the material of the reflecting layer 130, and the reflecting layer 130 may be made of any material being able to reflect light. In one example, the reflecting layer 130 may comprise a metal material, such as silver, copper, aluminum, etc. In another example, the reflecting layer 130 may comprise an organic material containing metal.

Shape features of the inclined reflective surface and the reflective surface are substantially determined by shape features of the patterned transparent layer 120. For example, an angle between the inclined reflective surface and the reflective surface is substantially equal to the angle θ between the inclined sidewall 122 of the patterned transparent layer 120 and the substrate 102. According to various embodiments of the present disclosure, the features of the patterned transparent layer 120 described hereinbefore have technical significance. For example, the angle θ is between about 100 degrees and about 150 degrees, the refractive index of the patterned transparent layer 120 is between about 1.4 and about 2.0, and the thickness d of the patterned transparent layer 120 is between about 2 μm and about 50 μm. The features and the value ranges mentioned above affects the stereoscopic aesthetics of the patterned opening 112 when viewed by observers.

Referring back to FIG. 1, at least one first sensing series 140 is disposed in the touch detecting region 102a of the substrate 102, and the first sensing series 140 extends along a first direction D1. The first sensing series 140 comprises a plurality of first touch sensing pads 142 and a plurality of first bridging lines 144. Each of the first bridging lines 144 interconnects two adjacent ones of the first touch sensing pads 142 in series. In this manner, the first sensing series 140 is formed.

At least one second sensing series 150 is disposed in the touch detecting region 102a, and the second sensing series 150 extends along a second direction D2. The second direction D2 is different from the first direction D1. For example, the first direction D1 may be the horizontal direction and the second direction D2 may be the vertical direction, as shown in FIG. 1. In other embodiments, the first direction D1 may not be perpendicular to the second direction D2. The second sensing series 150 comprises a plurality of second touch sensing pads 152 and a plurality of second bridging lines 154. Each of the second bridging lines 154 interconnects two adjacent ones of the second touch sensing pads 152 in series. In this manner, the second sensing series 150 is formed.

In one example, the touch panel 100 further comprises a patterned insulation layer 160 disposed between the first bridging lines 144 and the second bridging lines 154. Referring to FIG. 2B, the patterned insulation layer 160 is on the first bridging line 144, and a portion of the first bridging line 144 is not covered by the patterned insulation layer 160. For example, opposite ends of the first bridging line 144 are not covered by the patterned insulation layer 160. The second bridging line 154 crosses over the first bridging line 144 at a position on the patterned insulation layer 160. The patterned insulation layer 160 and the patterned transparent layer 120 in the peripheral region 102b may be made of the same film. In other words, the patterned insulation layer 160 and the patterned transparent layer 120 may be formed by a single photolithography process. Accordingly, the patterned insulation layer 160 and the patterned transparent layer 120 may be made of the same material, but the present disclosure is not limited in this regard. For example, the patterned insulation layer 160 and the patterned transparent layer 120 may be formed by different processes and made of different materials.

In one example, the touch panel 100 further comprises one or more contact pads 170 and one or more signal transmission lines 180. As shown in FIG. 1, the signal transmission lines 180 are connected to the contact pads 170, respectively. Each of the signal transmission lines 180 extends from the corresponding contact pad 170 and connects to the first sensing series 140 or the second sensing series 150. The contact pads 170, the signal transmission lines 180 and the reflecting layer 130 in the peripheral region 102b may be made of the same film. That is, the contact pads 170, the signal transmission lines 180, and the reflecting layer 130 may be formed by a single photolithography process. Under the circumstances, the reflecting layer 130, the contact pads 170, and the signal transmission lines 180 are made of the same material. Nevertheless, the reflecting layer 130, the contact pads 170, and the signal transmission lines 180 may be formed by different processes and made of different materials.

As illustrated above, according to one embodiment of the present disclosure, the patterned transparent layer 120 can be simultaneously formed when the patterned insulation layer 160 is formed. In addition, the reflecting layer 130 may be simultaneously formed when the contact pads 170 and the signal transmission lines 180 are formed. As a result, stereoscopic trademarks or marks indicating particular meanings can be provided without increasing the complexity of processing.

Second Embodiment

Figure 3A:
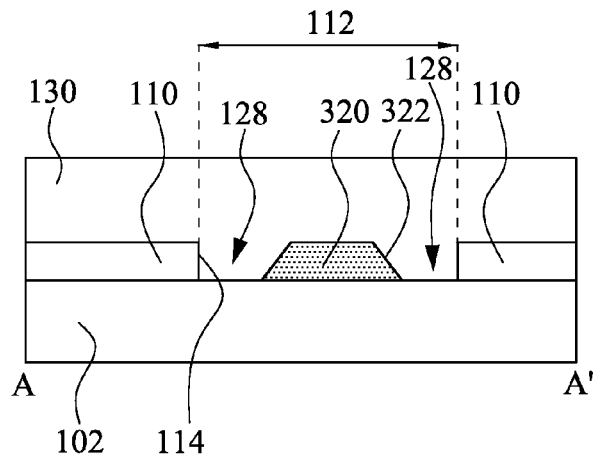
FIG. 3A and FIG. 3B are schematic cross-sectional views of a touch panel according to another embodiment of the present disclosure.
Figure 3B:
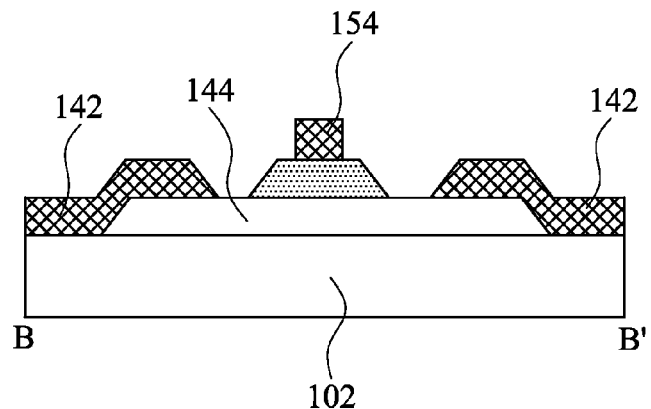

FIG. 3A and FIG. 3B are schematic cross-sectional views of a touch panel according to a second embodiment of the present disclosure. The touch panel of this embodiment differs from the touch panel of the first embodiment in the shape and position of the patterned transparent layer 320. In this embodiment, as shown in FIG. 3A, the patterned transparent layer 320 has an island-shaped pattern and is positioned in the patterned opening 112. The island-shaped patterned transparent layer 320 does not contact the sidewall 114 of the light-shielding layer 110, and therefore a second opening 128 is formed between the patterned transparent layer 320 and the light-shielding layer 110. The second opening 128 exposes a portion of the substrate 102 and is located between the sidewall 114 of the light-shielding layer 110 and the inclined sidewall 322 of the patterned transparent layer 320. The second opening 128 surrounds the inclined sidewall 322 of the patterned transparent layer 320. FIG. 3B depicts a schematic cross-sectional view of the touch panel in the touch detecting region according to this embodiment. The arrangement, structure, and other details of the first sensing series and the second sensing series in this embodiment may be the same as these described in the first embodiment.

Figure 3C:
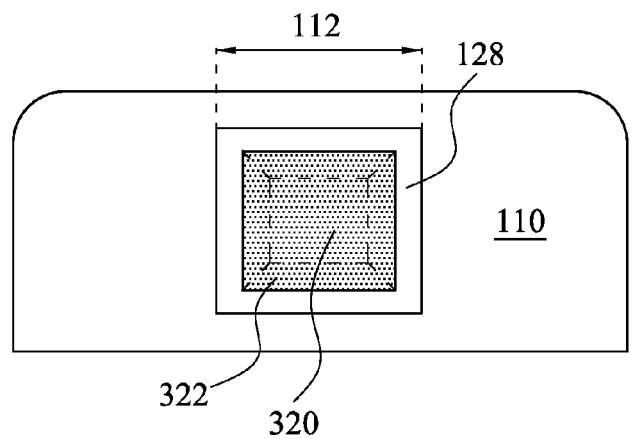
FIG. 3C is a schematic top view of a patterned opening when viewing from the side of the substrate according to another embodiment of the disclosure.

Referring to FIG. 3A, the reflecting layer 130 covers the inclined sidewall 322 of the patterned transparent layer 320 and the patterned opening 112. The interface between the reflecting layer 130 and the inclined sidewall 322 forms an inclined reflective surface, and an interface between the reflecting layer 130 and a top surface of the patterned transparent layer 320 forms another reflective surface. When users view the patterned opening 112 from the side of the substrate 102, a stereoscopic recessed effect is created by the inclined reflective surface and the reflective surface. FIG. 3C depicts a schematic top view of the patterned opening 112 when viewing from one side of the substrate 102. The stereoscopic recessed effect is created within the region where the patterned transparent layer 320 is located.

Other relevant structures and details in this embodiment are the same as these described in the first embodiment, and therefore the description is omitted to avoid repetition.

Third Embodiment

Figure 4:
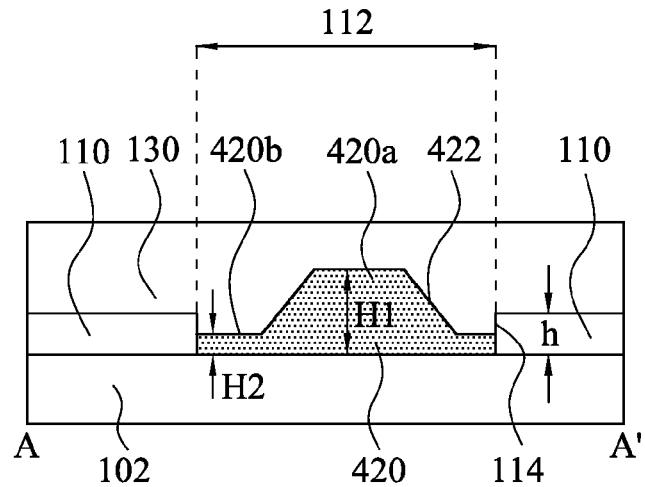
FIG. 4 is a schematic cross-sectional view of a patterned opening of a touch panel according to another embodiment of the disclosure.

The touch panel of this embodiment differs from the touch panel of the first embodiment in the shape and position of the patterned transparent layer 420. FIG. 4 is a schematic cross-sectional view of the patterned opening 112 of a touch panel of this embodiment. The patterned transparent layer 420 having different thicknesses is positioned in the patterned opening 112, and covers the patterned opening 112 completely. The patterned transparent layer 420 has a projection portion 420a and a surrounding portion 420b. The surrounding portion 420b surrounds the projection portion 420a, and a thickness H1 of the projection portion 420a is greater than a thickness H2 of the surrounding portion 420b. In one example, the thickness H1 of the projection portion 420a is greater than the thickness h of the light-shielding layer 110, and the thickness H2 of the surrounding portion 420b is smaller than the thickness h of the light-shielding layer 110. For example, the patterned transparent layer 420 in a center region (the projection portion 420a) has a relatively greater thickness, such as a thickness greater than the thickness h of the light-shielding layer 110, whereas the patterned transparent layer 420 in a region adjacent to the light-shielding layer 110 (the surrounding portion 420b) has a relatively smaller thickness, such as a thickness not greater than the thickness h of the light-shielding layer 110. In this manner, the patterned transparent layer 420 also has an inclined sidewall 422. The inclined sidewall 422 is formed between the projection portion 420a and the surrounding portion 420b, and the surrounding portion 420b contacts the sidewall 114 of the light-shielding layer 110. The reflecting layer 130 covers the inclined sidewall 422 of the patterned transparent layer 420 and the patterned opening 112. The interface between the reflecting layer 130 and the inclined sidewall 422 forms an inclined reflective surface, and the interface between the reflecting layer 130 and a top surface of the patterned transparent layer 420 forms another reflective surface. When users view the patterned opening 112 from the side of the substrate 102, a stereoscopic recessed effect is created by the inclined reflective surface and the reflective surface.

A method for manufacturing a touch panel according to one embodiment of the present disclosure is provided as follows. FIG. 5 to FIG. 8 are schematic cross-sectional views at different process step of the method according to one embodiment of the present disclosure. FIGS. 5A, 6A, 7A, and 8A depict cross-sectional views along line A-A' of FIG. 1 at different process steps. FIGS. 5B, 6B, 7B, and 8B depict cross-sectional views along line B-B' of FIG. 1 at different process steps.

Figure 5A:
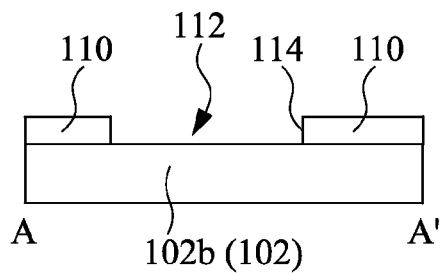
FIGS. 5A, 5B, 6A, 6B, 7A, 7B, 8A and 8B are schematic cross-sectional views at different process stages of a fabrication method according to one embodiment of the disclosure.
Figure 5B:
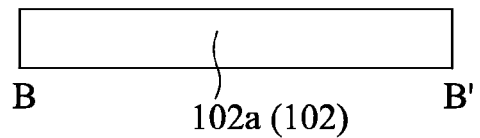

First, as shown in FIG. 5A and FIG. 5B, a light-shielding layer 110 is formed in a peripheral region 102b of a substrate 102. The light-shielding layer 110 has a patterned opening 112 and a sidewall 114. The sidewall 114 is adjacent to the patterned opening 112 and surrounds the patterned opening 112. The patterned opening 112 is configured to provide a mark identifiable by human eyes, such as a character, a trademark, or other patterns. The material of the light-shielding layer 110 may be, for example, a black resin. The light-shielding layer 110 having the patterned opening 112 may be formed by a screen printing process or a photolithography process.

Figure 6A:
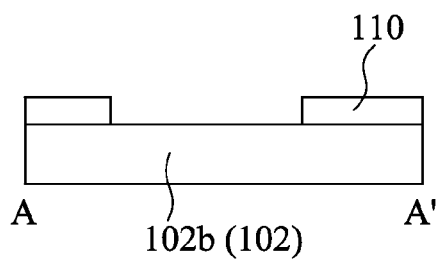
Figure 6B:
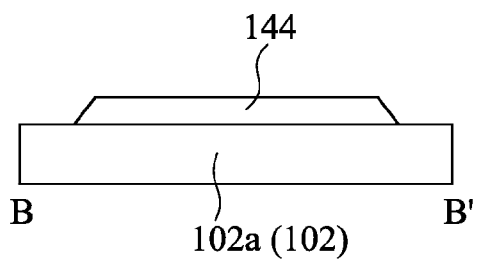

As shown in FIG. 6A and FIG. 6B, a plurality of first bridging lines 144 are then formed in a touch detecting region 102a of the substrate 102. The material of the first bridging line 144 may be, for example, a transparent conductive material such as indium tin oxide, etc., or an opaque material such as metal. The first bridging lines 144 may be formed by a typical photolithography process.

Figure 7A:
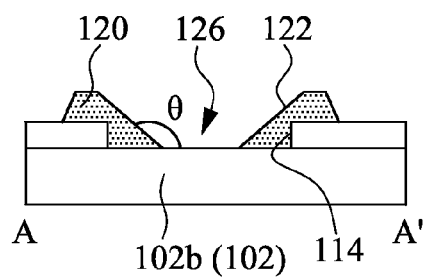
Figure 7B:
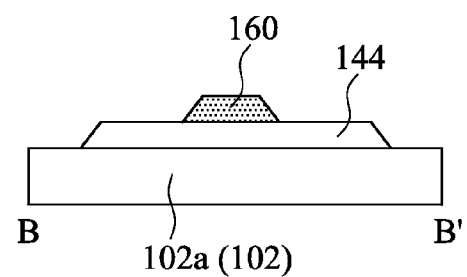

After that, as shown in FIG. 7A and FIG. 7B, a patterned insulation layer 160 is formed in the touch detecting region 102a and a patterned transparent layer 120 is formed in the peripheral region 102b. The patterned insulation layer 160 and the patterned transparent layer 120 may be formed by a single photolithography process. Specifically, the patterned insulation layer 160 is disposed on the first bridging line 144, and a portion of the first bridging line 144 is not covered by the patterned insulation layer 160. For example, two opposite ends of the first bridging line 144 are not covered by the patterned insulation layer 160. The patterned transparent layer 120 covers at least a portion of the patterned opening 112. The patterned transparent layer 120 has an inclined sidewall 122 positioned in the patterned opening 112. An angle θ is formed between the inclined sidewall 122 and a surface of the substrate 102. The angle θ may be, for example, between about 100 degrees and about 150 degrees. In the embodiment depicted in FIG. 7A, the patterned transparent layer 120 covers the sidewall 114 of the light-shielding layer 110, and the patterned transparent layer 120 has a first opening 126 exposing a portion of the substrate 102. The shape and position of the patterned transparent layer 120 may have various modifications. For example, as described in the second embodiment with reference to FIG. 3, the patterned transparent layer 320 may has an island-shaped pattern and is positioned in the patterned opening 112. The patterned transparent layer 320 does not contact the sidewall 114 of the light-shielding layer 110. Otherwise, as described in the third embodiment with reference to FIG. 4, the patterned transparent layer 420 having different thicknesses is positioned in the patterned opening 112, and covers the patterned opening 112 completely.

Figure 8A:
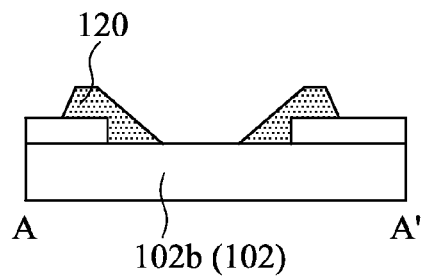
Figure 8B:
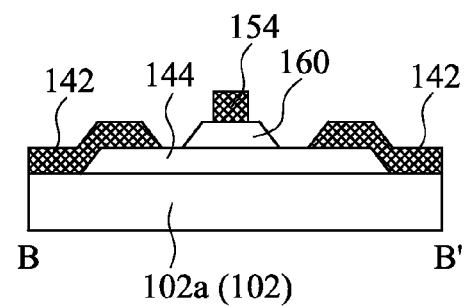

Thereafter, referring to FIG. 1, FIG. 8A, and FIG. 8B, a plurality of second bridging lines 154, a plurality of first touch sensing pads 142, and a plurality of second touch sensing pads 152 are formed in the touch detecting region 102a. Each of the second bridging lines 154 crosses over one of the first bridging lines 144 at a position on the patterned insulation layer 160. Each of the second bridging lines 154 interconnects two adjacent ones of the second touch sensing pads 152 in series, and thus the second bridging lines 154 and the second touch sensing pads 152 connected in series constitutes the second sensing series 150. In addition, as shown in FIG. 8B, two adjacent ones of the first touch sensing pads 142 respectively contact the two opposite ends of the first bridging lines 144 (the portions not covered by the patterned insulation layer 160). In this manner, each of the first bridging lines 144 interconnects two adjacent ones of the first touch sensing pads 142 in series to form the first sensing series 140.

Thereafter, a reflecting layer 130, a plurality of contact pads 170, and a plurality of signal transmission lines 180 are formed in the peripheral region 102b, and thus forming the touch panel shown in FIG. 1, FIG. 2A, and FIG. 2B. The reflecting layer 130, the contact pads 170, and the signal transmission lines 180 may be formed in a single photolithography process. Referring to FIG. 2A, the reflecting layer 130 covers the patterned transparent layer 120 and the patterned opening 112. The interface between the reflecting layer 130 and the inclined sidewall 122 forms an inclined reflective surface, and an interface between the reflecting layer 130 and the substrate 102 forms another reflective surface. In addition, as shown in FIG. 1, each of the signal transmission lines 180 extends from a corresponding one of the contact pads 170, and further connects to one of the first sensing series 140 or one of the second sensing series 150. The reflecting layer 130, the contact pad 170, and the signal transmission line 180 may comprise a metal material such as aluminum, silver, copper, chrome, etc., or comprise a conductive organic material containing metal, for example.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch panel, comprising:
   a substrate having a touch detecting region and a peripheral region surrounding the touch detecting region;
   a light-shielding layer disposed in the peripheral region of the substrate, the light-shielding layer having a patterned opening and a sidewall adjacent to the patterned opening, the patterned opening being configured to provide a mark identifiable by human eyes;
   a patterned transparent layer disposed in the peripheral region of the substrate, wherein the patterned transparent layer covers a portion of the patterned opening, and the patterned transparent layer has an inclined sidewall positioned in the patterned opening;
   a reflecting layer disposed in the peripheral region of the substrate, and covering the patterned transparent layer and the patterned opening;
   at least one first sensing series disposed in the touch detecting region of the substrate, the first sensing series extending in a first direction and comprising a plurality of first touch sensing pads and a plurality of first bridging lines, wherein each of the first bridging lines interconnects two adjacent first touch sensing pads in series; and
   at least one second sensing series disposed in the touch detecting region of the substrate, the second sensing series extending in a second direction different from the first direction, wherein the second sensing series comprises a plurality of second touch sensing pads and a plurality of second bridging lines, and each of the second bridging lines interconnects two adjacent second touch sensing pads in series.

2. The touch panel of claim 1, wherein the patterned transparent layer covers at least a portion of the sidewall of the light-shielding layer to form a first opening exposing a portion of the substrate.

3. The touch panel of claim 2, wherein the inclined sidewall surrounds the first opening.

4. The touch panel of claim 1, wherein the patterned transparent layer is to positioned in the patterned opening and is not in contact with the sidewall of the light-shielding layer to form a second opening exposing a portion of the substrate.

5. The touch panel of claim 4, wherein the second opening is located between the sidewall of the light-shielding layer and the inclined sidewall of the patterned transparent layer.

6. The touch panel of claim 1, further comprising a patterned insulation layer disposed between the first bridging lines and the second bridging lines, and each of the second bridging line crossing over one of the first bridging line.

7. The touch panel of claim 6, wherein the patterned insulation layer and the patterned transparent layer are made of the same film.

8. The touch panel of claim 6, wherein the patterned insulation layer and the patterned transparent layer are made of the same material.

9. The touch panel of claim 1, further comprising at least one contact pad and at least one signal transmission line, the signal transmission line extending from the contact pad and electrically connected to the first sensing series or the second sensing series.

10. The touch panel of claim 9, wherein the reflecting layer, the contact pad, and the signal transmission line are made of the same film.

11. The touch panel of claim 9, wherein the reflecting layer, the contact pad, and the signal transmission line are made of the same material.

12. The touch panel of claim 1, wherein an angle included between the inclined sidewall and the substrate is about 100 degrees to about 150 degrees.

13. The touch panel of claim 1, wherein a refractive index of the patterned transparent layer is about 1.4 to about 2.0.

14. The touch panel of claim 1, wherein a thickness of the patterned transparent layer is about 2 µm to about 50 µm.

15. The touch panel of claim 1, wherein a thickness of the light-shielding layer is about 2 µm to about 40 µm.

16. The touch panel of claim 1, wherein the patterned transparent layer comprises an organic material or an inorganic material.

17. The touch panel of claim 1, wherein the reflecting layer comprises a metal material or an organic material containing metal.

18. The touch panel of claim 1, wherein the patterned transparent layer completely covers the patterned opening, wherein the patterned transparent to layer has a projection portion and a surrounding portion encircling the projection portion, and the inclined sidewall is positioned between the projection portion and the surrounding portion.

19. The touch panel of claim 18, wherein a thickness of the projection portion is substantially greater than a thickness of the surrounding portion, and the thickness of the surrounding portion is substantially less than a thickness of the light-shielding layer.

* * * * *